United States Patent
Reul et al.

(10) Patent No.: US 9,171,658 B2
(45) Date of Patent: Oct. 27, 2015

(54) FLAT-CONDUCTOR CONNECTION ELEMENT FOR AN ANTENNA STRUCTURE

(75) Inventors: Bernhard Reul, Herzogenrath (DE); Stefan Droste, Herzogenrath (DE); Christoph Degen, Toenisvorst (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 185 days.

(21) Appl. No.: 14/110,124

(22) PCT Filed: Feb. 27, 2012

(86) PCT No.: PCT/EP2012/053245
§ 371 (c)(1),
(2), (4) Date: Nov. 21, 2013

(87) PCT Pub. No.: WO2012/136411
PCT Pub. Date: Oct. 11, 2012

(65) Prior Publication Data
US 2014/0060921 A1    Mar. 6, 2014

(30) Foreign Application Priority Data

Apr. 6, 2011   (EP) ..................................... 11161283

(51) Int. Cl.
*H01Q 1/12*       (2006.01)
*H01B 7/08*       (2006.01)
(Continued)

(52) U.S. Cl.
CPC ............. *H01B 7/0861* (2013.01); *H01B 13/06* (2013.01); *H01Q 1/1271* (2013.01); *H01Q 1/52* (2013.01); *H01Q 1/526* (2013.01); *Y10T 29/49018* (2015.01)

(58) Field of Classification Search
CPC ................... B32B 17/10174; B32B 17/10036; B32B 17/10293; H01Q 1/1271; H01Q 1/12; H01Q 1/38; H01Q 1/52; H01Q 1/526; H01Q 1/1278; H01Q 9/285; H01Q 21/26; H05B 3/84; H05B 2203/016; H05B 2203/002; H01B 7/0815; H01B 7/0861; H01B 13/06
USPC ......... 343/700, 702, 704, 718, 797, 793, 795, 343/829, 830, 892, 906; 174/70, 88, 117; 307/10.1, 9.1; 439/77, 83, 492, 493
See application file for complete search history.

(56) References Cited

U.S. PATENT DOCUMENTS 3,459,879 A    8/1969   Gerpheide
5,867,238 A    2/1999   Miller et al.
(Continued)

FOREIGN PATENT DOCUMENTS

DE    19536131    1/1997
DE    19735395    2/1998
(Continued)

OTHER PUBLICATIONS

PCT International Search Report mailed on May 11, 2012 for PCT Application PCT/EP2012/053245 filed on Feb. 27, 2012 in the name of Saint-Gobain Glass France (English Translation+German Original).

(Continued)

*Primary Examiner* — Timothy Thompson
*Assistant Examiner* — Guillermo Egoavil
(74) *Attorney, Agent, or Firm* — Steinfl & Bruno LLP

(57) ABSTRACT

A flat-conductor connection element for an antenna structure is described. The flat-conductor connection element is arranged in or on a pane and has: a flat conductor with a base layer, a conductor track, a first dielectric layer, a shield, and a second dielectric layer and a metal frame.

21 Claims, 9 Drawing Sheets

Figure 1A:
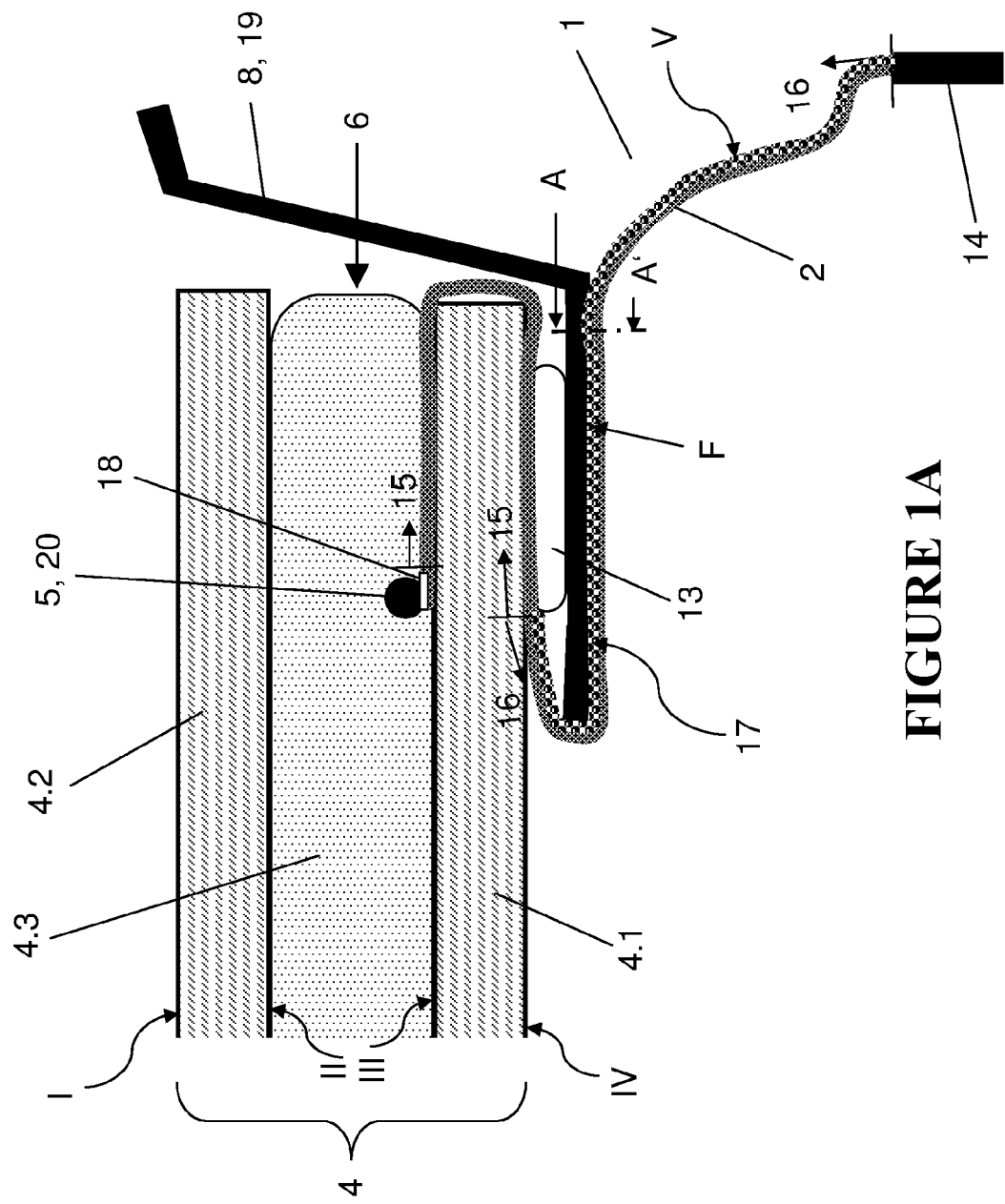

(51) Int. Cl.
*H01Q 1/52* (2006.01)
*H01B 13/06* (2006.01)

(56) References Cited

U.S. PATENT DOCUMENTS

| | | | |
|---|---|---|---|
| 6,320,276 | B1 | 11/2001 | Sauer |
| 6,809,692 | B2 | 10/2004 | Baliarda et al. |
| 7,903,042 | B2 | 3/2011 | Urban et al. |
| 2003/0112190 | A1 | 6/2003 | Baliarda et al. |
| 2006/0273966 | A1 | 12/2006 | MaCuser |
| 2011/0230146 | A1* | 9/2011 | Morishita ............ H01Q 1/243 455/77 |
| 2012/0162047 | A1* | 6/2012 | Mizuno et al. ................ 343/905 |

FOREIGN PATENT DOCUMENTS

| | | |
|---|---|---|
| DE | 19832228 | 2/2000 |
| DE | 10106125 | 8/2002 |
| DE | 20210286 | 12/2002 |
| DE | 10301352 | 7/2004 |
| DE | 10319606 | 11/2004 |
| DE | 202004001446 | 3/2005 |
| DE | 10351488 | 6/2005 |
| DE | 102004056866 | 1/2006 |
| DE | 202004019286 | 4/2006 |
| DE | 202004019286 U1 * | 5/2006 |
| EP | 0720249 | 7/1996 |
| FR | 2913141 | 8/2008 |
| WO | 2009/015975 | 2/2009 |

OTHER PUBLICATIONS

PCT Written Opinion of the International Searching Authority mailed on May 11, 2012 for PCT Application PCT/EP2012/053245 filed on Feb. 27, 2012 in the name of Saint-Gobain Glass France (English Translation+German Original).

* cited by examiner

FLAT-CONDUCTOR CONNECTION ELEMENT FOR AN ANTENNA STRUCTURE

CROSS REFERENCE TO RELATED APPLICATIONS

The present application is the US national stage of International Patent Application PCT/EP2012/053245 filed on Feb. 27, 2012 which, in turn, claims priority to European Patent Application EP 11161283.4 filed on Apr. 6, 2011.

The invention relates to a flat-conductor connection element for an antenna structure as well as a method for production thereof.

Current motor vehicles require a large number of technical devices to transmit and receive basic services such as radio reception, preferably in the AM, FM, or DAB bands, mobile telephony in the GSM 900, GSM 1800, and UMTS bands as well as satellite-assisted navigation (GPS).

The antennas built into conventional motor vehicle window panes are of the linear emitter type. Here, the term "linear emitter" describes a linear antenna that is suitable both to receive and to transmit electromagnetic waves. Linear emitters have a geometric length that exceeds their geometric width by multiple orders of magnitude. The geometric length of a linear emitter is the distance between the antenna foot point and the antenna tip; the geometric width, the dimension perpendicular thereto. As a rule, for linear emitters, the following relationship applies: length/width 100. The same applies with linear emitters, to their geometric height (H), meaning a dimension that is both perpendicular to the length and also perpendicular to the width, where, as a rule, the relationship length/height ≥100 applies.

Linear emitters can even be used in windshields of motor vehicles provided they do not, in compliance with legal regulations, impair the driver's vision. This can, for example, be achieved by means of fine wires with a diameter of, typically, 10 to 150 μm. A satisfactory antenna signal can be provided by linear emitters in the range of the terrestrial broadcast bands II through V. According to a definition of the International Telecommunication Union (ITU), this is the frequency range from 87.5 MHz to 960 MHz (band II: 87.5-100 MHz, band III: 162-230 MHz, band IV: 470-582 MHz, band V: 582-960 MHz). However, satisfactory reception performance cannot be obtained by linear emitters in the preceding frequency range of band I (41-68 MHz). The same is also true for frequencies below band I.

Plane-shaped antennas are better suited for the reception of frequencies in the range of band I. Such plane-shaped antennas or planar antennas are suited both for the reception and the transmission of electromagnetic waves and are also referred to in the following as planar emitters.

Planar emitters are based on a surface-wise, electrically conductive, transparent coating and are known, for example, from the printed publications DE 101 06 125 A1, DE 103 19 606 A1, EP 0 720 249 A2, US 2003/0112190 A1, and DE 198 32 228 C2. The conductive coating is galvanically or capacitively coupled to a coupling electrode, and the antenna signal is made available in the edge region of the pane at the so-called antenna foot point.

Through a suitable combination of linear emitters and planar emitters, highly broadband hybrid antennas for reception and transmission of electromagnetic waves in a motor vehicle can be provided.

The antenna signals are fed via a connector conductor to a receiver, typically with interconnection of an antenna amplifier. Customarily used as connector conductors are unshielded stranded wires or flat conductors. These have a relatively low ohmic resistance and cause only slight ohmic power losses. Such unshielded stranded wires or flat conductors permit no defined signal transmission because, due to inevitable positional tolerances, undefined couplings to the electrically conductive vehicle body or nearby conductors can occur such that the range of fluctuation of important antenna properties such as bandwidth, efficiency, and line impedance is relatively great. Furthermore, slightly electromagnetic interference is coupled into the system via such unshielded connector conductors and passed on to the antenna amplifier.

U.S. Pat. No. 3,459,879 A discloses a flexible, multi-conductor flat conductor. Individual conductors are arranged either in pairs with a ground conductor or have a shared one-sided flat ground conductor.

DE 195 36 131 01 discloses a method for producing a diversity antenna pane provided with connection elements. On a class pane, the connection surfaces of a plurality of antenna elements including shielded conductors and ground conductors are clustered locally in proximity to each other at a location in the edge region of the pane. The connection surfaces of the connection element are soldered to the connection surfaces of the glass pane.

DE 10 2004 056 866 A1 describes a flat conductor with a plurality of conductor tracks, of which at least one is implemented as a grounding conductor and is connected to a shield. The flat conductor can be produced simply and economically by an extrusion method.

DE 103 51 488 A1 discloses an antenna arrangement for transmitting and receiving electromagnetic signals, with the antenna arrangement comprising a flat carrier substrate made from a dielectric material. A first conductor track that has a contact point for gathering or injecting signals on one end and a first dipole on its opposite end is applied on a surface of the carrier substrate. A second conductor track that has a contact point for gathering or injecting signals on one end and a second dipole on its opposite end is applied on the other surface of the carrier substrate. The first and the second dipole form a crossed dipole.

DE 197 35 395 A1 describes a window pane antenna, whose main element is formed by a light-transparent, thin, electrically conductive layer attached surface-to-surface in a region of the window pane and the conductive surface thus formed is affixed on the window glass. The conductive surface applied on the window pane is formed from a limited-conductivity layer with non-negligible surface resistivity. A substantially planar electrode made of a conductive material is formed on this layer for high-frequency connection to this layer, which electrode is connected at least in the region of its edge to the limited conductivity surface with low high-frequency loss.

DE 103 01 352 B3 discloses a solder connector element for at least one contact surface of an electrical conductor that is to be soldered to a conductor structure provided on a substrate. The electrical conductor is covered, at least on the side that is to be turned toward the substrate, by an insulating cover foil. The cover foil is provided in the region of the contact surface with a recess, the edge of which surrounds the contact surface.

WO 2009/015 975 A1 describes a multi-pathway flat conductor having a solder connector element for contacting electrically conductive structures, for example, on a glass pane. The solder connector element includes, in the region surrounding each contact point to be soldered, an adhesive to fix the position of the solder connector element and to prevent short circuits through molten solder material.

DE 202 10 286 U1 describes an adapter in the form of a flexible connection element for linking electrically conductive structures on motor vehicle window panes to continuing networks outside the panes. The electrically conductive structures are, for example, antennas. The adapter is made of a flexible foil-like carrier material on which conductor tracks run. The adapter includes a shoe made of a nonconductive material with metal contact springs that are pressed against the contact surfaces of the electrically conductive structures.

FR 2 913 141 A3 describes a flexible flat conductor for contacting electrically conductive structures on the surface of a pane. The individual conductor tracks are arranged running parallel to each other and between two plastic films, with one of the plastic films connected to the pane via an adhesive surface.

DE 20 2004 01 9286 U1 discloses a flat conductor-external connector element for windowpanes with at least one conductor track electrically connected to electrical components arranged on or in the window pane and extending outward beyond the edge of the pane surface and insulation surrounding this that is provided with local reinforcement against mechanical wear. The reinforcement is made of a smooth-surfaced material, preferably capable of self-healing of surface damage, that adheres to the insulation.

Signal losses can be avoided through the use of special high-frequency conductors, for example, coaxial conductors, which have, in addition to a signal conductor, at least one ground conductor along with them. However, such high-frequency conductors are complex and cost intensive and need relatively large installation space. Moreover, they require an equally complex connection technique.

In contrast, the object of the present invention consists in providing an antenna pane with a flat-conductor connection element with improved signaling and low susceptibility to interference signals. The antenna pane with a flat-conductor connection element should, moreover, be simple and economical to produce, have a simple connection technique, and not be sensitive to positional tolerances on installation in a metal frame or a vehicle body. This and other objects are accomplished according to the proposal of the invention by means of a flat-conductor connection element for an antenna structure with the characteristics of the independent claim. Advantageous embodiments of the invention are set forth through the characteristics of the dependent claims.

A method for producing a flat-conductor connection element with an antenna structure as well as the use of a flat-conductor connection element with an antenna structure emerge from other independent claims.

In motor vehicles, the antenna amplifier is electrically connected to the electrically conductive vehicle body, with a reference potential, hereinafter referred to as reference ground, effective for high-frequency applications predetermined for the antenna signal by this electrical connection. The difference between the potential of the antenna signal and the potential of the reference ground yields the available antenna power.

In the flat-conductor connection element according to the invention, an antenna structure is arranged in or on a pane. The flat conductor comprises:
 a base layer,
 a conductor track, which is arranged above the base layer,
 a first dielectric layer, which is arranged above the conductor track,
 a shield, which is arranged, at least in sections, above the first dielectric layer, and
 a second dielectric layer, which is arranged above the shield.

The conductor track is electrically conductively, preferably galvanically or capacitively, connected to the antenna structure via a connection surface. The flat conductor runs out over the edge of the pane. Outside the pane, the flat conductor runs, at least in sections, adjacent a metal frame. The shield is thereby capacitively coupled to a reference ground via the metal frame.

The term "above" refers here to the position in the layer sequence of the flat conductor. This means that the flat conductor comprises the following successive layers:
 a base layer,
 a conductor track, which is arranged on the base layer,
 a first dielectric layer, which is arranged on the conductor track, and if the conductor track is narrower than the base layer, also on the exposed base layer,
 a shield, which is arranged, at least in sections, on the first dielectric layer, and
 a second dielectric layer, which is arranged on the shield.

The various layers of the flat conductor can be glued together by additional adhesive layers.

In an advantageous embodiment of the flat-conductor connection element according to the invention, the shield is arranged between the conductor track and the metal frame. The metal frame is not part of the flat-conductor connection element but rather, for example, part of a window frame or a vehicle body. The shield, the second dielectric layer, and a subregion of the metal frame form a capacitor arrangement, via which the shield is capacitively coupled to the metal frame.

In an advantageous embodiment of the flat-conductor connection element according to the invention, the shield of the flat conductor runs over at least 50%, preferably over at least 75%, and particularly preferably over at least 90% of the area of the flat conductor outside the pane. "Area of the flat conductor" means, in this case, the surface of a flat side of the flat conductor. The shield can, to improve the shield, also be arranged in the region in or on the pane.

In an advantageous embodiment of the flat-conductor connection element according to the invention, the metal frame comprises a vehicle body or a movable metal frame, in particular a metal window frame. The metal frame need not necessarily run as a closed loop around the outer edge of the pane. In the context of the invention, a "metal frame" also includes a metal and/or electrically conductive section, for example, a strip, an L-shaped or a U-shaped frame that can serve as a reference ground of the antenna structure.

In an advantageous embodiment of the flat-conductor connection element according to the invention, the shield is arranged in the range of an area of 30 $mm^2$ to 200 $mm^2$ at a distance of 0.2 mm to 2 mm from the metal frame. The base layer, the first dielectric layer, and/or the second dielectric layer have a relative permittivity value from 1 to 6, preferably from 2 to 4, and particularly preferably from 3 to 3.5.

At least the shield, the second dielectric layer, and the metal frame form a capacitor. In an advantageous embodiment of the flat-conductor connection element according to the invention, the capacitance of the capacitor is from 5 nF to 10 pF and preferably from 0.1 nF to 2 nF. A high-pass filter is formed by the capacitor. Spurious electromagnetic radiation above the cutoff frequency fG of the high-pass filter is guided from the shield to the reference ground via the high-pass filter.

In an advantageous embodiment of the flat-conductor connection element according to the invention, the cutoff frequency of the signaling from the shield to the reference ground is from 20 MHz to 1000 MHz.

In an advantageous embodiment of the flat-conductor connection element according to the invention, the base layer, the first dielectric layer, and/or the second dielectric layer includes a plastic, preferably polyimide (PI), polyamide (PA), polyethylene (PE), polypropene (PP), polybutylene terephthalate (PBT), polycarbonate (PC), polyethylene terephthalate (PET), polyethylene naphthalate (PEN), polybutadiene, polyvinyl chloride (PVC), or polytetrafluoroethylene (PTFE) as well as mixtures and/or copolymers thereof. The base layer, the first dielectric layer, and/or the second dielectric layer can also include a varnish layer, preferably alkyd resin, acrylic resin, epoxy resin, or polyurethane, or an adhesive, preferably acrylate adhesive, methyl methacrylate adhesive, polyurethanes, polyolefins, cyanoacrylate adhesive, poly epoxies, silicone adhesive, and/or silane cross-linking polymer adhesives, RTV silicone rubber, HTV silicone rubber, peroxide vulcanizing silicone rubber, and/or addition vulcanizing silicone rubber, as well as mixtures and/or copolymers thereof.

The second dielectric layer can also include a gas, preferably air, with the distance between the shield and a metal frame formed, for example, by spacers.

Moreover, the second dielectric layer can be formed on the metal frame by a plastic layer or a varnish layer, for example, a coat of paint on the vehicle body.

In an advantageous embodiment of the flat-conductor connection element according to the invention, the pane includes a single pane or a composite pane. The single pane or the individual panes of the composite pane include, for example, a glass and/or a plastic.

In an advantageous embodiment of the flat-conductor connection element according to the invention, the conductor track and/or the shield includes a metal foil, a metallized plastic film, an electrically conductive plastic film, or a metal wire mesh. The conductor track can also include a metal wire. The conductor track and/or the shield preferably include a metal that is highly conductive electrically, particularly preferably copper, aluminum, tin, gold, silver, or mixtures thereof.

In an advantageous embodiment of the flat-conductor connection element according to the invention, the shield has a width greater than the width of the conductor track. The ratio between the width of the shield and the width of the conductor track determines, among other things, the impedance of the flat conductor and is from 2:1 to 1000:1, preferably from 5:1 to 30:1, and particularly preferably from 10:1 to 20:1.

In an advantageous embodiment of the flat-conductor connection element according to the invention, the antenna structure comprises at least one linear emitter, one planar emitter, or a hybrid structure made of linear emitters and planar emitters.

The planar emitter comprises at least one electrically conductive, preferably transparent coating that covers at least one inner or outer side of the individual pane or the composite pane at least in sections and serves at least in sections as a plane-shaped antenna for reception of electromagnetic waves. The conductive coating is suitably configured for use as a planar antenna and can, for this purpose, largely cover the surface of the pane. The antenna structure further comprises at least one coupling electrode electrically coupled to the conductive coating for emission of antenna signals from the planar antenna. The coupling electrode can, for example, be coupled capacitively or galvanically to the conductive coating.

The linear emitter comprises at least one linear antenna conductor, laid, for example, in the form of a wire inside a composite pane or made of a metallic printing paste, printed, for example, by the screen printing method, on at least one side of a single pane or of an individual pane of a composite pane.

In a hybrid antenna structure, a planar emitter and a linear emitter are combined with each other and the signal is preferably made available to a shared antenna foot point. For this purpose, the antenna conductor and the shared antenna foot point are electrically conductively connected to each other via a second connection conductor.

Another aspect of the invention comprises a pane with a flat-conductor connection element and an antenna structure arranged in or on the pane.

Another aspect of the invention comprises a method for producing a flat-conductor connection element for an antenna structure, wherein:
a) a conductor track of a flat conductor is connected to an antenna structure on a first pane,
b) the flat conductor is led out over an outer edge of the first pane,
c) the first plane is installed in a metal frame,
wherein a shield of the flat conductor is arranged over at least one second dielectric layer, at least in sections, adjacent the metal frame, and the shield is capacitively coupled to a reference ground via the metal frame.

In another embodiment of the method according to the invention, in the second step b) the flat conductor is led out over an outer edge of a first pane and the first pane is connected surface-to-surface to a second pane glass via a thermoplastic adhesive layer.

Another aspect of the invention comprises that use of a flat-conductor connection element for an antenna structure in a vehicle body or a vehicle door of a means of transportation on land, on water, or in the air, in a metal frame of a building, preferably an exterior façade or a building window, or in a functional and/or decorative individual piece and as a built-in part in furniture and devices.

It is understood that the various embodiments of the antenna structure according to the invention can be realized individually or in any combinations. In particular, the above mentioned characteristics and those to be illustrated in the following can be used not only in the combinations indicated, but also in other combinations or alone without departing from the scope of the present invention.

The invention further comprises a pane arrangement with a flat-conductor connection element with a pane in a metal frame connected to a reference ground, for example, a windshield pane or rear window pane in a motor vehicle body, an antenna structure arranged in or on the pane, and a flat-conductor connection element connected to the antenna structure.

The pane arrangement with a flat-conductor connection element for an antenna structure according to the invention comprises at least:
  a pane, which is arranged in a metal frame,
  an antenna structure, which is arranged in or on the pane,
  a flat conductor with
    a base layer,
    a conductor track, which is arranged above the base layer,
    a first dielectric layer, which is arranged above the conductor track,
    a shield, which is arranged, at least in sections, above the first dielectric layer, and
    a second dielectric layer, which is arranged above the shield,
  and the metal frame is connected to a reference ground,
wherein the conductor track is electrically conductively connected to the antenna structure and the flat conductor runs outward over the edge of the pane, and the flat conductor is arranged adjacent, at least in sections, to the metal frame and the shield is capacitively coupled to the reference ground via the metal frame.

It is understood that the design characteristics of the flat-conductor connection element also apply to the flat-conductor connection element in the pane arrangement.

Figure 1B:
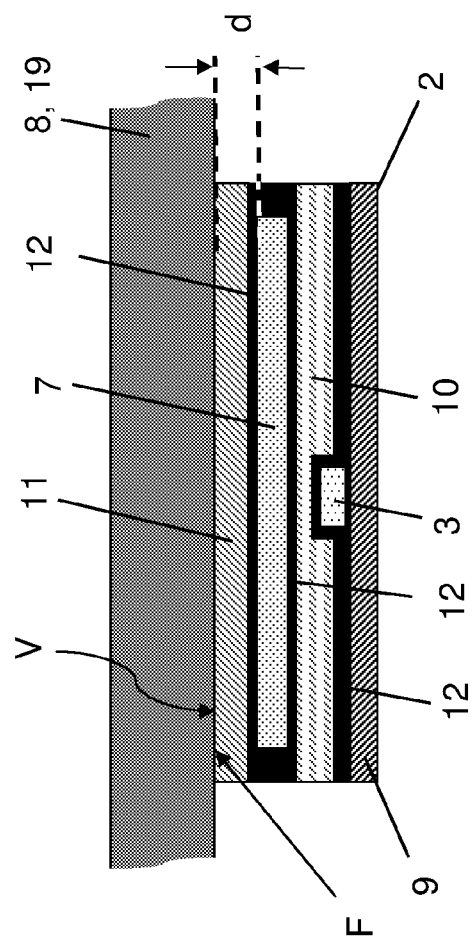
Figure 2:
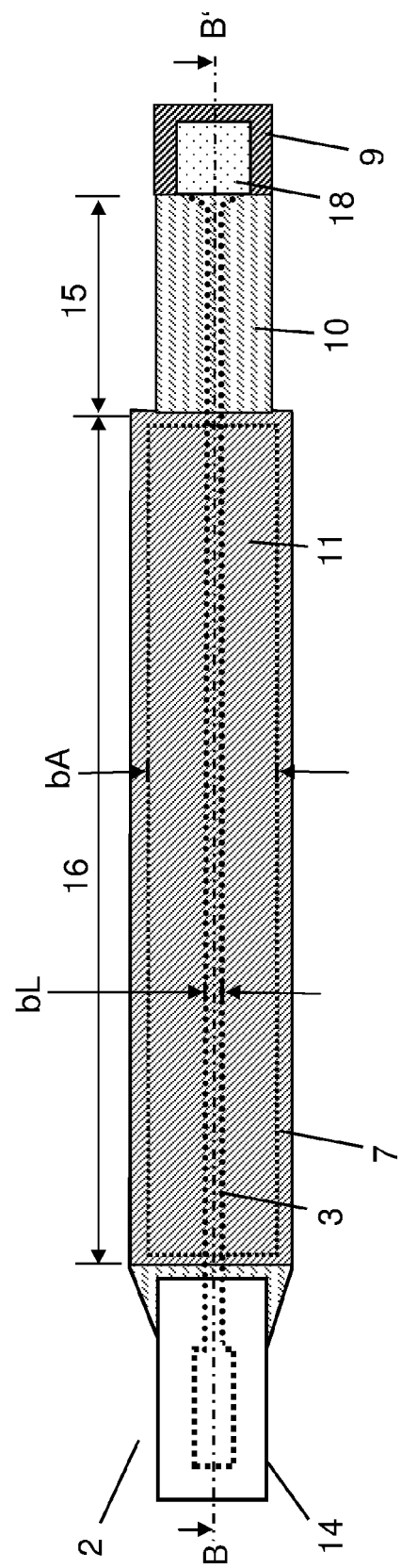
Figure 3:
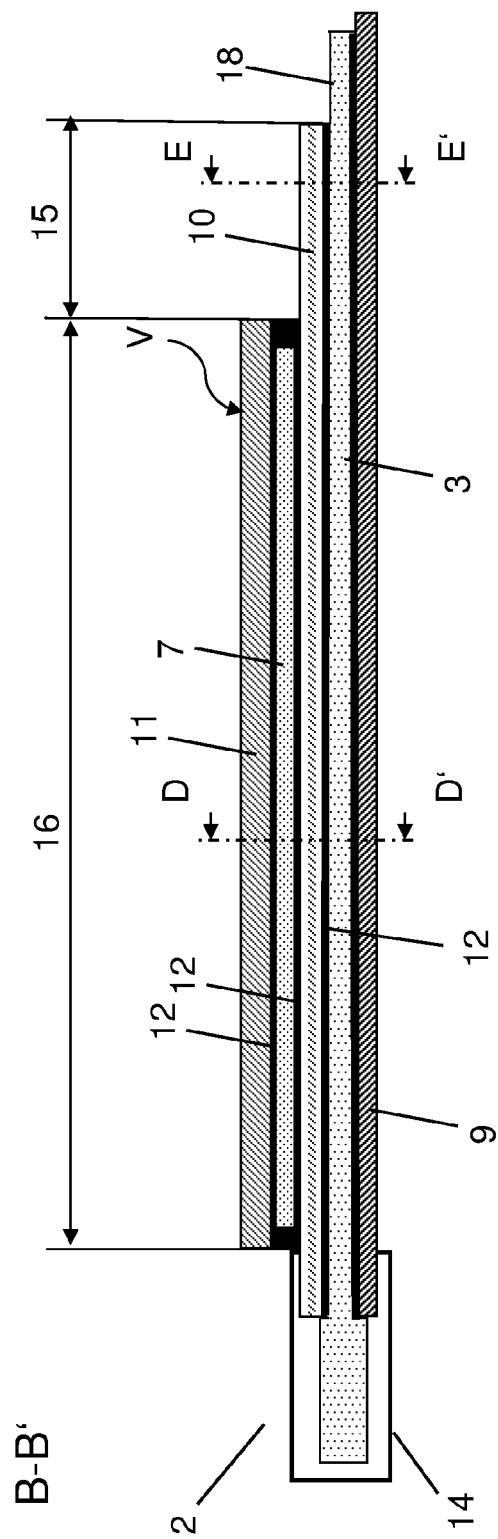
Figure 4:
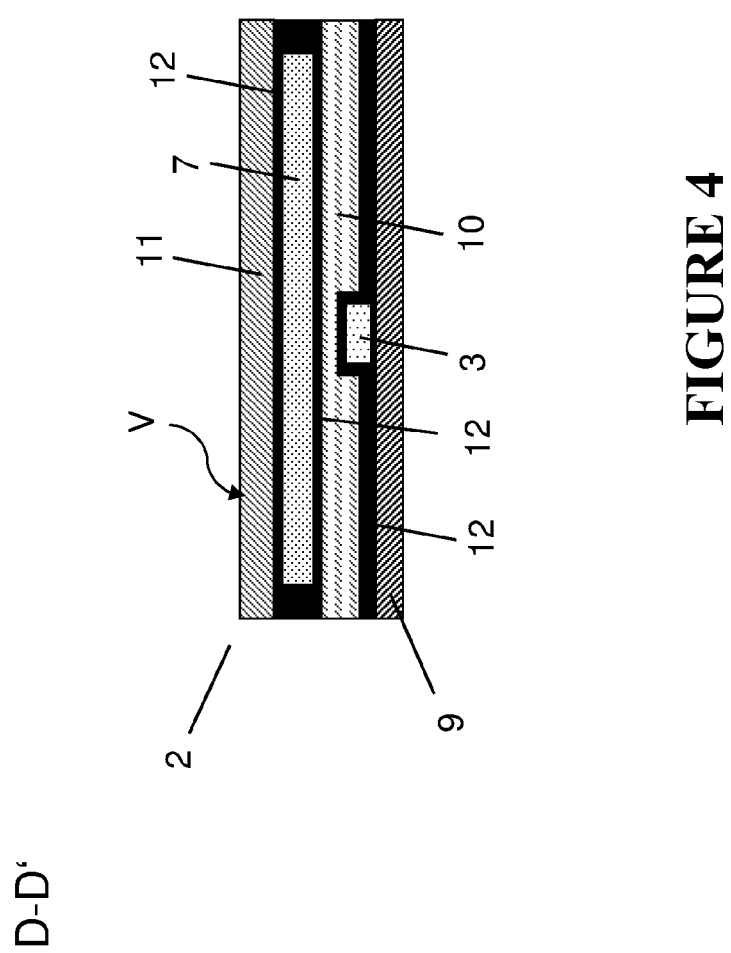
Figure 5:
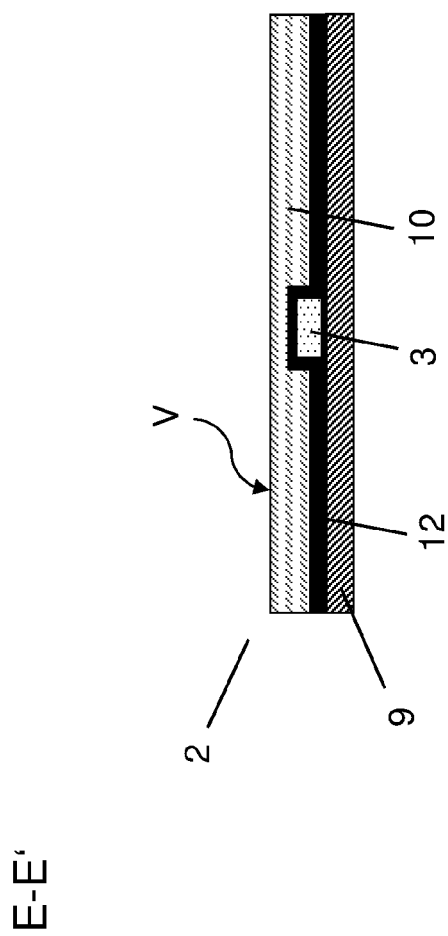
Figure 6:
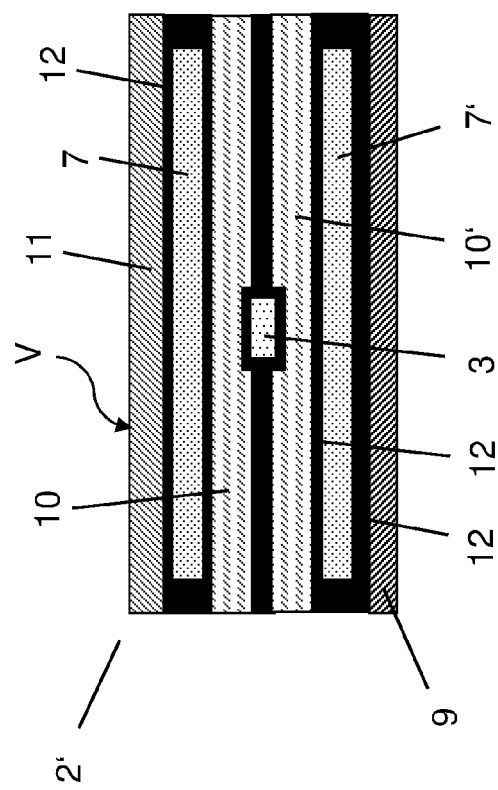
Figure 7:
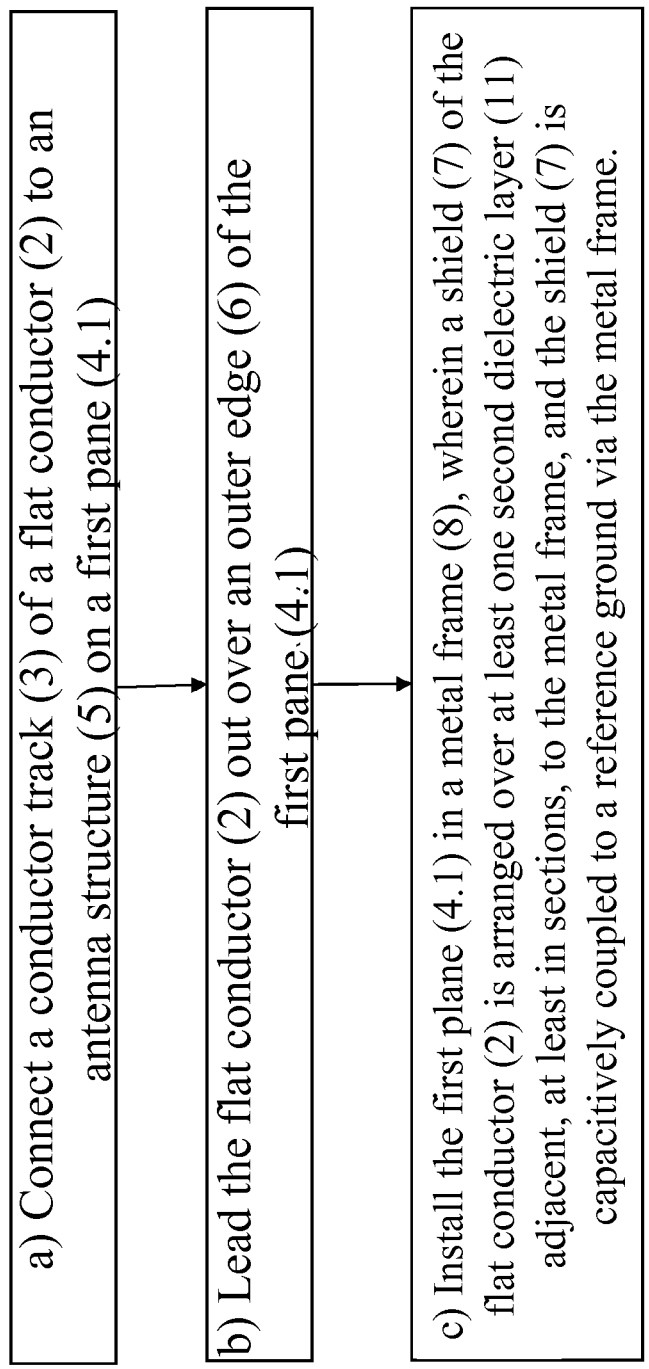
Figure 8:
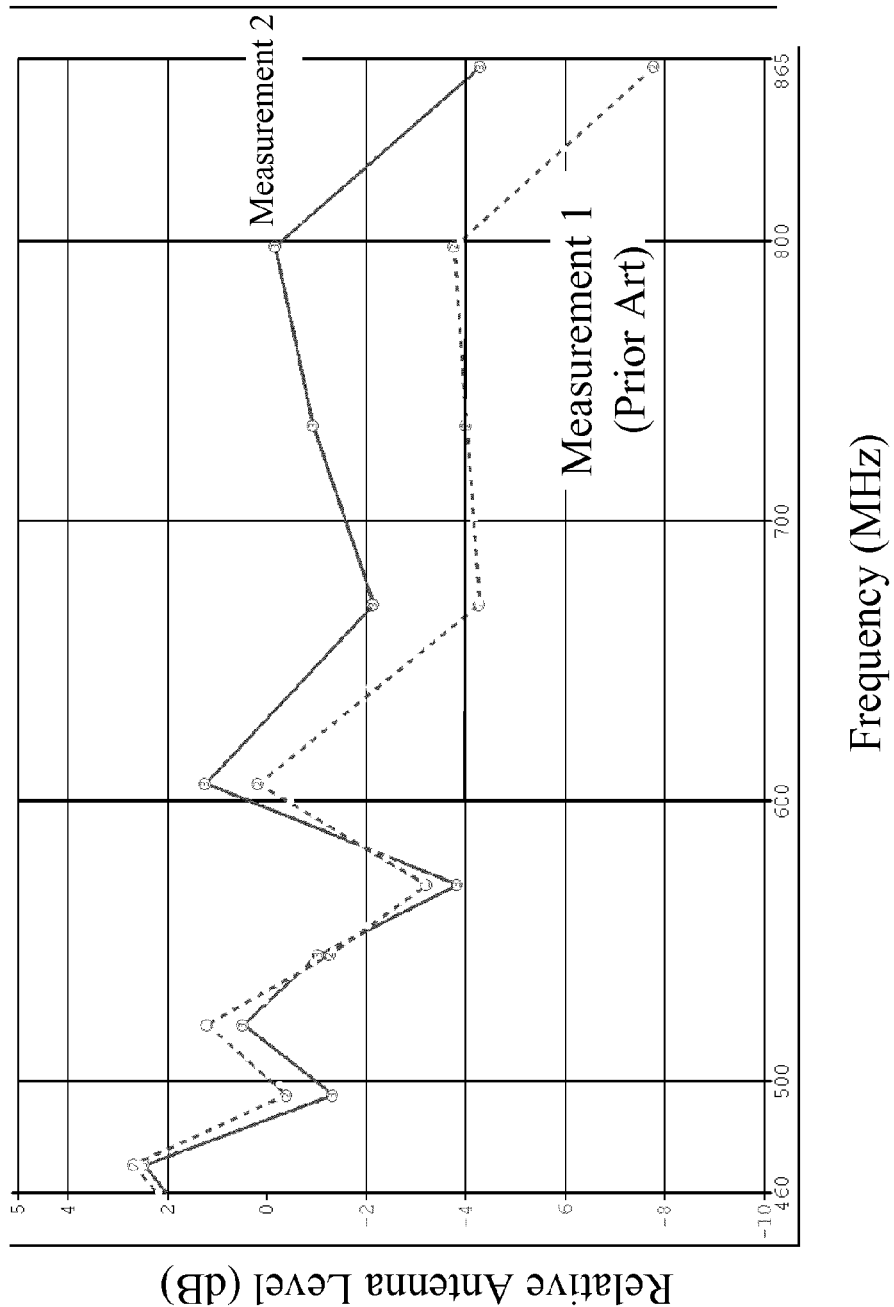

The invention is explained in detail in the following with reference to drawings and an example. The drawings are not completely to scale. The invention is in no way restricted by the drawings. They depict:

FIG. 1A a cross-sectional view of a flat-conductor connection element for an antenna structure, FIG. 1B a cross-sectional view along section line A-A' of FIG. 1A, FIG. 2 a schematic plan view of a flat conductor according to the invention, FIG. 3 a cross-sectional view along section line B-B' of FIG. 2, FIG. 4 a cross-sectional view along section line D-D' of FIG. 3, FIG. 5 a cross-sectional view along section line E-E' of FIG. 3, FIG. 6 a cross-sectional view of another exemplary embodiment of a flat conductor according to the invention, FIG. 7 a flowchart of an exemplary embodiment of the method according to the invention, and FIG. 8 a diagram with a comparative measurement.

FIG. 1A depicts a cross-sectional view of a pane arrangement with a flat-conductor connection element 1 for an antenna structure 5, wherein the antenna structure 5 is arranged in the interior of a composite pane 4.

The composite pane 4 comprises two individual panes, namely, a rigid first pane 4.1 and a rigid second pane 4.2, which are fixedly bonded to each other via a thermoplastic adhesive layer 4.3. The individual panes have roughly the same size and are made, for example, of glass, in particular float glass, cast glass, and ceramic glass, being equally possibly produced from a non-glass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). Generally speaking, any material with sufficient transparency, adequate chemical resistance, as well as suitable shape and size stability can be used. For use elsewhere, for example, as a decorative piece, it would also be possible to produce the first pane 4.1 and the second pane 4.2 from a flexible material and/or a nontransparent material. The respective thickness of the first pane 4.1 and the second pane 4.2 can vary widely depending on the application and, for glass, can, for example, be in the range from 1 to 24 mm.

As is customary, the surfaces of the panes are referenced with the Roman numerals I-IV, with side I corresponding to the outer side of the first pane 4.1, side II the inner side of the first pane 4.1, side III the inner side of the second pane 4.2, and side IV the outer side of the second pane 4.2 of the composite pane 4. In the application as a windshield, side I is turned toward the outside environment and side IV is turned toward the passenger compartment of the motor vehicle.

The adhesive layer 4.3 for bonding the first pane 4.1 and the second pane 4.2 preferably contains an adhesive plastic, preferably based on polyvinyl butyral (PVB), ethylene vinyl acetate (EVA), or polyurethane (PU). The adhesive layer 4.3 can, for example, be implemented as a trilayer. In the case of a trilayer, a film, which includes, for example, polyethylene terephthalate (PET), is arranged between two layers of an adhesive plastic. The PET film can serve as a carrier of a conductive layer and can thus be an integral part of the antenna, in particular of the planar emitter.

The composite pane 4 is transparent to visible light, for example, in the wavelength range from 350 nm to 800 nm, with the term "transparency" meaning light permeability of more than 50%, preferably more than 70%, and particularly preferably more than 80%.

The composite pane 4 is glued by an adhesive strand 13 into a metal frame 8, for example, a vehicle body 19 or a vehicle door. The composite pane 4 serves, for example, as a windshield of a motor vehicle, but can also be used elsewhere.

Furthermore, the second pane 4.2 is provided with an opaque paint layer that is applied on side II and forms a frame-like circumferential masking strip, which is not depicted in detail in the figures. The paint layer is made, preferably, of an electrically nonconductive, black pigmented material that can be baked into the first pane 4.1 or the second pane 4.2. On the one hand, the masking strip prevents the visibility of the adhesive strand 13 with which the composite pane 4 is glued into the vehicle body 19; on the other, it serves as UV protection for the adhesive material used.

Situated within an edge zone of the composite pane 4, embedded in the adhesive layer 4.3, is an antenna structure 5 in the form of a linear, unshielded antenna conductor 5. The antenna conductor 5 serves as a linear antenna for reception of electromagnetic waves, preferably in the frequency range of the terrestrial broadcast bands II through V and is suitably configured for this purpose. In the present exemplary embodiment, the antenna conductor 5 is implemented in the form of a wire that is preferably longer than 100 mm and narrower than 1 mm. The linear conductivity of the antenna conductor 5 is preferably less than 20 ohm/m, particularly preferably less than 10 ohm/m. In the exemplary embodiment depicted, the length of the antenna conductor 5 is ca. 650 mm with a width of 0.75 mm. Its linear conductivity is, for example, 5 ohm/m.

The antenna conductor 5 has an adequate distance from the pane edge 6, by means of which coupling to the vehicle body 19 is thwarted.

In another exemplary embodiment, the antenna structure 5 comprises a planar antenna. The planar antenna includes a transparent conductive coating that is arranged, for example, on side III of the second pane 4.2. In another exemplary embodiment, the antenna structure 5 comprises a hybrid antenna structure made from a planar antenna and a linear antenna whose signals are guided outward via a shared antenna foot point 20.

In the hybrid antenna structure, the transparent, electrically conductive coating can, depending on the material composition, fulfill other functions. For example, it can serve as a heat-ray reflecting coating for the purpose of solar protection, thermoregulation, or heat insulation, or as a heating layer for the electrical heating of the composite pane 4. These functions are of secondary importance for the present invention.

The antenna structure 5 is connected via its antenna foot point 20 to the electrical connection surface 18 of the conductor track 3 of a flat conductor 2. The connection between the antenna foot point 20 and the electrical connection surface 18 takes place, for example, by soldering, ultrasonic bonding, gluing, or clamping.

FIG. 1B depicts a cross-sectional view of the flat conductor 2 according to the invention along section line A-A' of FIG. 1A. The flat conductor 2 comprises a base layer 9, which includes a film of an insulating or dielectric material, preferably a plastic such as polyimide (PI). The base layer 9 preferably has a thickness from 10 μm to 500 μm and, for example, 25 μm.

A conductor track 3 is arranged above the base layer 9. The conductor track 3 includes a foil of a metal that is highly conductive electrically, for example, copper. The thickness of the conductor track 3 is from 10 μm to 500 μm and, for example, 35 μm.

A first dielectric layer 10 is arranged above the conductor track 3. The first dielectric layer 10 includes a film of a dielectric material, preferably a plastic such as polyimide (PI). The first dielectric layer 10 has a thickness from 10 μm to 2000 μm and, for example, 100 μm.

A shield 7 is arranged above the first dielectric layer 10. The shield 7 includes a foil of a metal that is highly conductive electrically, for example, copper. The thickness of the shield 7 is from 10 μm to 500 μm and, for example, 35 μm.

The conductor track 3, the first dielectric layer 10, and the shield 7 form a so-called asymmetric microstrip conductor, in which the signals of the antenna structure 5 are favorably guided.

A second dielectric layer 11 is arranged above the shield 7. The second dielectric layer 11 includes a film of a dielectric material, preferably a plastic such as polyimide (PI). The second dielectric layer 11 has a thickness from 10 μm to 500 μm and, for example, 25 μm.

The base layer 9, the conductor track 3, the first dielectric layer 10, the shield 7, and the second dielectric layer 11 are glued together by suitable adhesive layers 12, for example, by an acrylate adhesive.

The flat conductor 2 runs outward over the edge 6 of the composite pane 4. The flat conductor 2 is arranged adjacent the vehicle body 19 in the region of the area F. The top V of the flat conductor 2 points toward the vehicle body 19. The top V of the flat conductor 2 is the outer side of the second dielectric layer 11. The shield 7 is arranged below the second dielectric layer 11. The distance d of the shield 7 from the vehicle body 19 is determined by the thickness of the second dielectric layer 11 and the thickness of the adhesive layer 12 between the shield 7 and the second dielectric layer 11.

The shield 7, the second dielectric layer 11, the adhesive layer 12, and the vehicle body 19 form a capacitor in the region of the area F. The capacitance C of the capacitor results from the area F, the thickness of the second dielectric layer 11, and its permittivity value as well as the thickness of the adhesive layer 12 between the shield 7 and the second dielectric layer 11 and the permittivity value of the adhesive layer 12. The shield 7 is capacitively coupled via the capacitor to the vehicle body 19 and thus to the reference ground. A high-pass filter, via which spurious electromagnetic radiation above the cutoff frequency fG of the high-pass filter is guided to the reference ground, is formed by the capacitor.

The area F, where the shield 7 is situated at a distance d from the vehicle body 19, is preferably from 30 mm$^2$ to 200 mm$^2$. The width of the area F corresponds, for example, to a width of the shield 7 of bA=12 mm. The length of the area F is, for example, 20 mm. The area F is, for example, 240 mm$^2$. The distance d corresponds to the thickness of the second dielectric layer 11 and is, for example, 25 μm. Disregarding the adhesive layer 12 between the shield 7 and the second dielectric layer 11, a capacitance C of, for example, 0.3 nF results. The resistance of the conductor track 3 is, for example, roughly 2 ohm. The cutoff frequency fG of the high-pass filter formed by the capacitor is, for example, $fG=1/(2*Pi*R*C) \approx 275$ MHz.

In an advantageous embodiment of the flat-conductor connection element 1 according to the invention, the top V of the flat conductor 2 can be connected to the vehicle body 19 via another adhesive layer.

In another advantageous embodiment of the flat-conductor connection element 1 according to the invention, the top V of the flat conductor 2 can be arranged on the side facing away from the vehicle body 19. The shield 7 is then capacitively coupled to the vehicle body 19 via the first dielectric layer 10 and the base layer 9 as well as the adhesive layers 12 arranged therebetween.

FIG. 2 depicts a plan view of a flat conductor 2 according to the invention. The positions of conductor track 3 and of the shield 7 in the interior of the flat conductor 2 are represented by dotted lines. The flat conductor 2 has, on one end, an electrical connection surface 18 of the conductor track 3 auf. The flat conductor 2 has, on its other end, a plug 14. The plug 14 is connected to the conductor track 3. The antenna signal can be guided via the plug 14 to another connection line, for example, a shielded coaxial cable, or directly to the input of receiving electronics.

FIG. 3 depicts a cross-sectional view along section line B-B' of FIG. 2. The flat conductor 2 has a region 16 with the shield 7 and a region 15 without the shield 7. FIG. 4 depicts a cross-sectional view of the region 16 with the shield 7 along section line D-D' of FIG. 3, and FIG. 5 depicts a cross-sectional view along section line E-E' of FIG. 3. In the region 15 without the shield 7, the flat conductor 2 has a smaller thickness and is arranged mainly inside the composite pane 4.

The width bL of the conductor track 3 is from 0.01 mm to 20 mm and, for example, 0.3 mm. In the exemplary embodiment depicted, the conductor track is arranged along the midline of the base layer 9.

The width bA of the shield 7 is from 0.02 mm to 30 mm and, for example, 12 mm. The width bA of the shield 7 is preferably greater by a factor from 5 to 30 than the width bL of the conductor track 3.

The width of the base layer 9, of the first dielectric layer 10, and of the second dielectric layer 11 is preferably wider by 0.5 mm to 5 mm than the width bA of the shield 7 and is, for example, 15 mm. Reliable electrical insulation and protection against corrosion of the conductor track 3 and of the shield 7 are achieved by means of the protruding edge.

The permittivity value of the base layer 9, of the first dielectric layer 10, and of the second dielectric layer 11 is from 1 to 6, preferably from 3 to 4 and, for example, 3.4. The permittivity value of the adhesive of the adhesive layers 12 is, for example, roughly 3.

The widths and thicknesses of the base layer 9, of the first dielectric layer 10 and of the second dielectric layer 11, of the adhesive layers 12, of the conductor track 3, and of the shield 7 are selected such that the line impedance of the foil conductor 2 is roughly 50 ohm. The line impedance of the foil conductor 2 is thus adapted to the input impedance of commercially available antenna amplifiers.

The line impedance of the foil conductor 2 is substantially determined by the mutually fixed positional arrangement of conductor track 2 and shield 7. This renders the flat conductor 2 according to the invention not sensitive to positional tolerances on installation into the vehicle body 19.

FIG. 6 depicts a cross-sectional view of another exemplary embodiment of a flat conductor according to the invention 2'. The flat conductor 2' is designed, in its shielded region 16, as a symmetric microstrip conductor. To avoid unnecessary repetition, only the differences relative to the exemplary embodiment of FIG. 4 are described; and, otherwise, reference is made to the statements there. A further shield 7' is arranged between the base layer 9 and conductor track 3 of the flat conductor 2'. A further first dielectric layer 10' is arranged between the shield 7' and conductor track 3. In the case of this embodiment of the flat conductor 2' according to the invention, the conductor track 3 is shielded both on the bottom and the top. The shield 7 is capacitively coupled according to the invention to the reference ground via the vehicle body 19. Via the flat arrangement adjacent the shield 7, the shield 7' is capacitively coupled thereto. By means of this capacitive coupling, the shield 7' is also capacitively coupled to the reference ground. In an advantageous embodiment of the flat conductor 2', the shield 7 is galvanically connected to the shield 7'. The galvanic connection occurs, for example, by a connection of the shields 7 and 7' in their edge region.

FIG. 7 depicts a flowchart of an exemplary embodiment of the method according to the invention.

FIG. 8 depicts the diagram of a comparative measurement between a flat-conductor connection element according to the prior art (Measurement 1) and a flat-conductor connection element 1 according to the invention (Measurement 2). The antenna structure 5 was a hybrid structure of a planar antenna and a linear antenna. The diagram depicts the relative antenna level over the frequency of the incoming high-frequency radiation. The high-frequency radiation was polarized horizontally. The relative antenna level depicted in the diagram is an averaging over the antenna level of the directional diagram.

The relative antenna level measured on a flat-conductor connection element according to the prior art (Measurement 1) shows, starting from a frequency of roughly 600 MHz, a clearly greater reduction than the relative antenna level measured on a flat-conductor connection element 1 according to the invention. The relative antenna level of a flat-conductor connection element according to the prior art (Measurement 1) is, compared to a flat-conductor connection element 1 according to the invention, at a frequency of, for example, 800 MHz, reduced by 4 dB. Consequently, the flat-conductor connection element 1 according to the invention is better suited for forwarding high-frequency signals, such as signals for terrestrial television reception, than a flat-conductor connection element according to the prior art.

The flat-conductor connection element 1 according to the invention is simple and economical to produce. Since the shield 7 of the flat-conductor connection element 1 is capacitively coupled to the reference ground, no additional connection technique is necessary other than the connection of the conductor track 3. A pane with a flat-conductor connection element 1 according to the invention can be installed simply and quickly in a vehicle. At the same time, the line impedance of the flat-conductor connection element 1 according to the invention is not sensitive to positional tolerances on installation in the vehicle body 19.

This result was unexpected and surprising for the person skilled in the art.

LIST OF REFERENCE CHARACTERS 1 pane with flat-conductor connection element
2, 2' flat conductor
3 conductor track
4 pane, composite pane
4.1 first pane
4.2 second pane
4.3 thermoplastic adhesive layer
5 antenna structure
6 edge of the pane 4
7, 7' shield
8 metal frame
9 base layer
10, 10' first dielectric layer
11 second dielectric layer
12 adhesive layer
13 adhesive strand, adhesive connection to the vehicle body 19
14 plug
15 unshielded region
16 shielded region
17 surface of the capacitive coupling
18 electrical connection surface of the conductor track 3
19 vehicle body
20 antenna foot point
A-A' section line
B-B' section line
D-D' section line
E-E' section line
bA width of the shield 7
bL width of the conductor track 3
d distance between shield 7 and metal frame 8
C capacitance
fG cutoff frequency
F area, coupling area
R resistance of the conductor track 2
I outer side of the first pane 4.1, outer side of the pane 4
II inner side of the first pane 4.1
III inner side of the second pane 4.2
IV outer side of the second pane 4.2, inner side of the pane 4
V shielded side of the flat conductors 2

The invention claimed is:

1. A flat-conductor connection element for an antenna structure, which is arranged in or on a pane, comprising:
 a flat conductor comprising:
  a base layer,
  a conductor track, which is arranged above the base layer,
  a first dielectric layer, which is arranged above the conductor track,
  a shield, which is arranged, at least in sections, above the first dielectric layer, and
  a second dielectric layer, which is arranged above the shield, and
 a metal frame, wherein
  the conductor track is electrically conductively connected to the antenna structure and the flat conductor runs outward over an edge of the pane, and
  the flat conductor is arranged, at least in sections, adjacent the metal frame and the shield is capacitively coupled to a reference ground via the metal frame.

2. The flat-conductor connection element according to claim 1, wherein the shield is arranged between the conductor track and the metal frame.

3. The flat-conductor connection element according to claim 1, wherein the shield extends over at least 50% of a surface of the flat conductor outside the pane.

4. The flat-conductor connection element according to claim 1, wherein the metal frame comprises a vehicle body or a movable metal frame, in particular a metal window frame.

5. The flat-conductor connection element according to claim 1, wherein the shield is arranged with an area of 30 mm$^2$ to 200 mm$^2$ at a distance of 0.02 mm to 2 mm from the metal frame and the second dielectric layer has a relative permittivity value of 1 to 6.

6. The flat-conductor connection element according to claim 1, wherein a capacitance between the shield and the metal frame is from 5 nF to 10 pF.

7. The flat-conductor connection element according to claim 1, wherein the base layer, the first dielectric layer, and/or the second dielectric layer comprises:
 A) a plastic, B) a varnish layer, or C) a gas.

8. The flat-conductor connection element according to claim 1, wherein the conductor track and/or the shield comprises a metal foil, a metallized polymer film, a metal wire, or a metal wire mesh.

9. The flat-conductor connection element according to claim 1, wherein the conductor track and/or the shield comprises i) copper, ii) aluminum, iii) tin, iv) gold, v) silver, or mixtures of i)-v).

10. The flat-conductor connection element according to claim 1, wherein the shield comprises a metal foil, wherein the metal foil has a width greater than a width of the conductor track.

11. The flat-conductor connection element according to claim 1, wherein the antenna structure comprises at least one linear emitter, one planar emitter, or a hybrid structure made of linear emitters and planar emitters.

12. A pane comprising the flat-conductor connection element according to claim 1.

13. A method for producing the flat-conductor connection element for an antenna structure according to claim 1, comprising the steps:
   a) connecting the conductor track of the flat conductor to the antenna structure on a first pane,
   b) leading the flat conductor out over an outer edge of the first pane, and
   c) installing the first pane in the metal frame,
   wherein the shield of the flat conductor is arranged over the second dielectric layer adjacent, at least in sections, to the metal frame and the shield is capacitively coupled to the reference ground via the metal frame.

14. The method for producing the flat-conductor connection element according to claim 13, wherein in step b), the flat conductor is led out over the outer edge of the first pane, and the first pane is connected surface-to-surface to a second pane via a thermoplastic adhesive layer.

15. A method comprising:
   using the flat-conductor connection element according to claim 1 for an antenna structure, wherein
   the flat-conductor connection element is arranged on a single pane, in a composite glass pane or on the composite glass pane;
   A) in a vehicle body or a vehicle door of a means of transportation on land, on water, or in air,
   B) in a metal frame of a building, preferably an exterior façade or a building window, or
   C) in a functional and/or decorative individual piece and as a built-in part in furniture and devices.

16. The flat-conductor connection element according to claim 3 wherein the shield extends over at least 75% of the surface of the flat conductor outside the pane.

17. The flat-conductor connection element according to claim 3, wherein the shield extends over at least 90% of the surface of the flat conductor outside the pane.

18. The flat-conductor connection element according to claim 7, wherein the plastic is:
   i) polyimide,
   ii) polyamide,
   iii) polyethylene,
   iv) polypropene,
   v) polybutylene terephthalate,
   vi) polycarbonate,
   vii) polyethylene terephthalate,
   viii) polyethylene naphthalate,
   ix) polybutadiene,
   x) polyvinyl chloride,
   xi) polytetrafluoroethylene,
   xii) mixtures of the plastics i)-xi), or
   xiii) copolymers of the plastics i)-xi).

19. The flat-conductor connection element according to claim 7, wherein the varnish layer is alkyd resin, acrylic resin, epoxy resin, polyurethane, or an adhesive.

20. The flat-conductor connection element according to claim 19, wherein the adhesive is
   i) acrylate adhesive,
   ii) methyl methacrylate adhesive,
   iii) polyurethanes,
   iv) polyolefins,
   v) cyanoacrylate adhesive,
   vi) poly epoxies,
   vii) silicone adhesive,
   viii) silane cross-linking polymer adhesives,
   ix) RTV silicone rubber,
   x) HTV silicone rubber,
   xi) peroxide vulcanizing silicone rubber,
   xii) addition vulcanizing silicone rubber,
   xiii) mixtures of the adhesives i)-xii), or
   xiv) copolymers of the adhesives i)-xii).

21. The flat-conductor connection element according to claim 7, wherein the gas is air.

* * * * *